(12) United States Patent
Mowers et al.

(10) Patent No.: US 6,421,885 B1
(45) Date of Patent: Jul. 23, 2002

(54) BATTERY HOLDER

(75) Inventors: Charles T. Mowers, Bald Knob, AR (US); Robert C. Wingrove, Shoreview, MN (US)

(73) Assignee: Rehabilicare, Inc., New Brighton, MN (US)

( * ) Notice: Subject to any disclaimer, the term of this patent is extended or adjusted under 35 U.S.C. 154(b) by 0 days.

(21) Appl. No.: 09/397,418

(22) Filed: Sep. 17, 1999

Related U.S. Application Data

(60) Provisional application No. 60/100,707, filed on Sep. 17, 1998.

(51) Int. Cl.[7] .................................................. A45F 5/02
(52) U.S. Cl. ....................................................... 24/3.12
(58) Field of Search ................................ 24/3.12, 3.11, 24/182, 528; 224/668, 269, 272; 33/768, 769, 770

(56) References Cited

U.S. PATENT DOCUMENTS

| | | | |
|---|---|---|---|
| 4,111,343 A | * | 9/1978 | Selinko |
| 4,557,024 A | * | 12/1985 | Roberts et al. |
| 4,584,250 A | | 4/1986 | Hooke et al. |
| 4,690,654 A | | 9/1987 | DeLaney |
| 4,741,074 A | * | 5/1988 | Budano, II et al. |
| 4,880,712 A | | 11/1989 | Gordecki |
| 5,108,847 A | | 4/1992 | Edwards et al. |
| 5,161,906 A | | 11/1992 | Eppler |
| 5,191,975 A | * | 3/1993 | Pezzoli et al. |
| 5,328,781 A | | 7/1994 | Mikake |
| 5,337,484 A | | 8/1994 | Cardon |
| 5,436,088 A | | 7/1995 | Castaneda et al. |
| 5,489,485 A | | 2/1996 | Peot et al. |
| 5,489,486 A | | 2/1996 | Glover |
| 5,567,545 A | | 10/1996 | Murakami |
| 5,601,940 A | | 2/1997 | Denecke |
| 5,634,815 A | | 6/1997 | Inazuka et al. |
| 5,651,626 A | | 7/1997 | Chen |
| 5,661,392 A | | 8/1997 | Imazeki |
| 5,763,112 A | | 6/1998 | Redford |
| 5,863,674 A | | 1/1999 | Yamanaka |
| 6,233,789 B1 | * | 5/2001 | Douglas |

FOREIGN PATENT DOCUMENTS

| | | | |
|---|---|---|---|
| DE | 4310602 | * | 5/1994 |
| GB | 2213522 | * | 8/1989 |

* cited by examiner

*Primary Examiner*—James R. Brittain
(74) *Attorney, Agent, or Firm*—Patterson, Thuente, Skaar & Christensen, P.A.

(57) ABSTRACT

An assembly for use in a portable device casing to allow solderless electrical contact members to be used in cooperation with a power supply and components designed to be powered by the power supply.

21 Claims, 6 Drawing Sheets

BATTERY HOLDER

REFERENCE TO RELATED APPLICATION

This application claims the benefit of priority based on U.S. Provisional Application No. 60/100,707 filed Sep. 17, 1998.

FIELD OF THE INVENTION

A device casing for receipt of a battery having solderless pressure springs therein.

BACKGROUND OF THE INVENTION

Various cases and designs are used for portable devices. Such cases include locations for electronic components, mechanical components, and typically a power supply. Although most of these cases may be manufactured inexpensively, those portions which require soldering or other processing steps to achieve connection among the parts does add cost to the assembly. In similar fashion, certain processes, such as soldering, may not allow enough tolerance for error or normal size variations of power supplies or other components to be fitted within the space defined by a portion of the soldered subcomponent. Accordingly, techniques of improvement for casing design are much needed.

SUMMARY OF THE INVENTION

The invention comprises utilization of solderless battery contacts which are readily inserted into and adjacent to a power supply enclosure within a portable device casing.

DETAILED DESCRIPTION OF THE PREFERRED EMBODIMENTS

Figure 1:
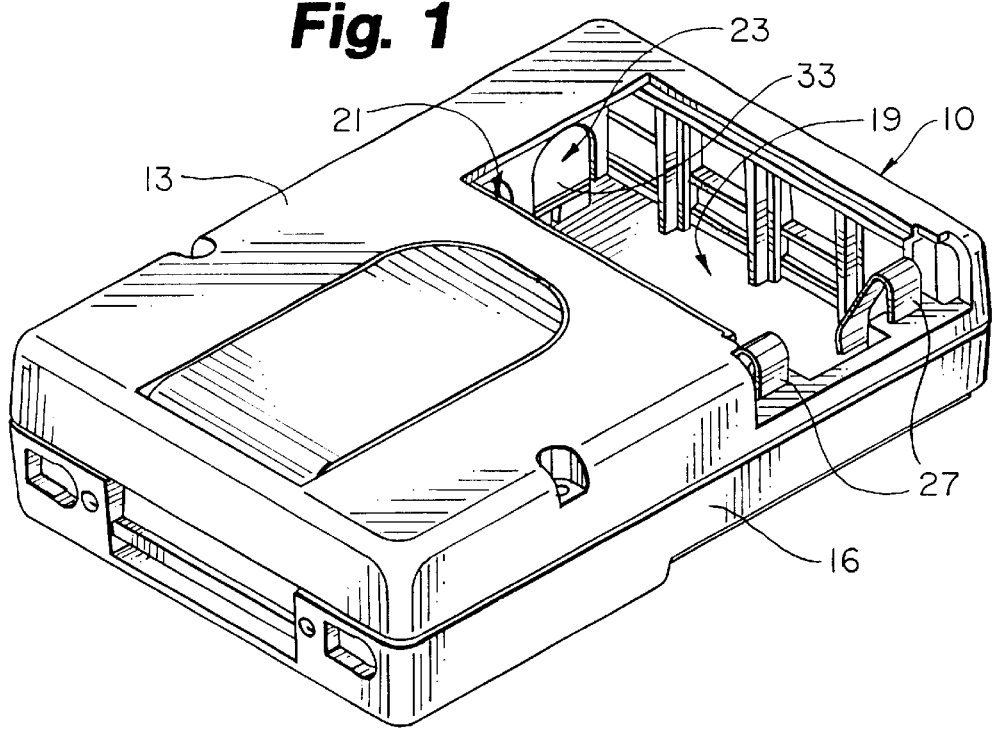
FIG. 1 is a bottom perspective view of a device casing.
Figure 2:
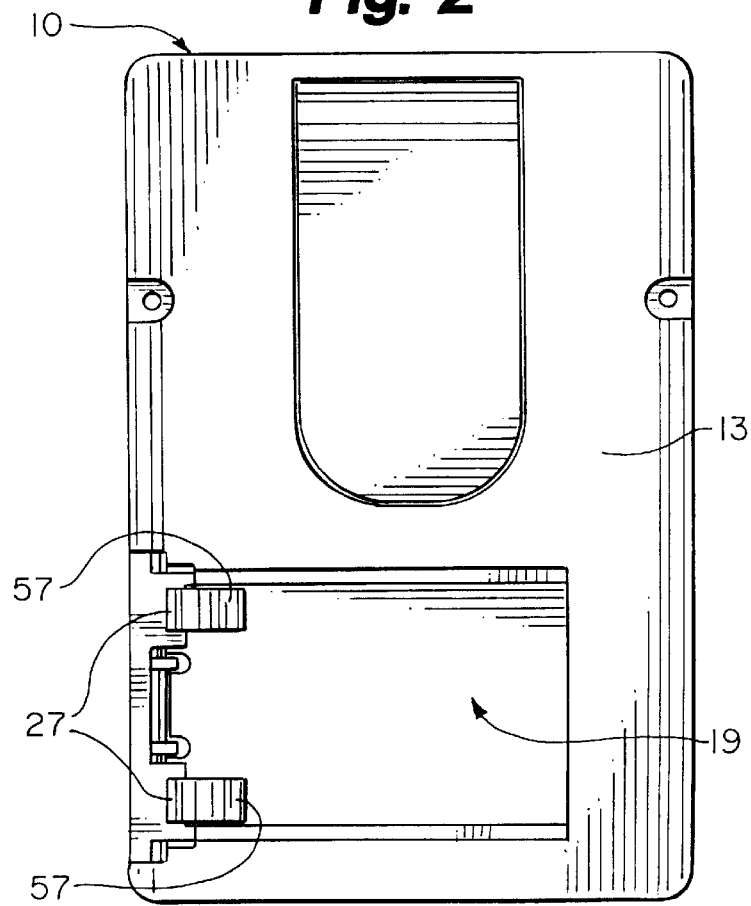
FIG. 2 is a bottom plan view of the device casing illustrated in FIG. 1.

FIG. 1 illustrates a portable device casing 10 having a plurality of different features. A case bottom portion 13 is shown connected to case top portion 16. Portable device casing 10 may be used for various purposes, and is designed, in this embodiment, for retaining a power supply within power supply chamber 19, shown without a power supply therein in FIG. 1. In this embodiment, although the invention is not so limited, it may be useful to place a 9 volt battery, such as a 9-Volt alkaline battery, into power supply chamber so that the male extensions from the battery align and fit within receiving areas 21, 23, and the opposing ends of the battery may then be aligned in contact with battery spring members 27.

In one embodiment, battery spring members 27 and solderless battery contact member 33 are integrally formed with the initial molding of one or more portions of the portable device casing. For example, such molding may comprise an ABS or polycarbonate injection molding to simultaneously construct the casing or a portion of the casing along with solderless battery contact member 33 and battery springs 27. However, to achieve optimum performance flexibility and adaptability for varying size batteries or other power supplies, it is desirable to utilize non-integrally formed members 27, 33 and instead to use utilize the readily insertable members shown in FIGS. 1 through 5. Referring to FIGS. 1 through 5, it may be seen that a plurality of designs are possible for use with this invention, and fall within the scope of protection described and claimed herein. Referring first to battery spring members 27, it can be seen particularly in FIGS. 1, 2, and 3 that an anchor portion 41 comprises a portion of member 27 which is secured in some fashion to a portion of portable device casing 10. In the embodiment illustrated particularly in FIGS. 1, 3, and 5 it may be seen that anchor portion 41 is inserted into a receiving slot or similar cavity defined by walls 48. In this embodiment anchoring means 53 is also provided as a detent mechanism designed to permit insertion of anchor portion 41 into the receiving slot, but to not allow removal of anchor portion. Spring portion 57 comprises a resilient extension designed for contacting a first end of a power supply at subportion 62. The contact of subportion 62, along with its resilient force, urges the power supply first end toward the direction of solderless battery contact member 33. Subportion 66 of spring portion 57, shown in FIG. 3 in alternate embodiment shapes, facilitates insertion of a power supply into power supply chamber 19 in the easiest manner possible. It is recognized that one or more battery spring members may be utilized in accordance with this invention. It is also understood that various anchoring means having different type of constructions are contemplated within the scope of the invention, for example including mechanical detents of a different design, mechanical engagement of a one-way or releasable structure, pressure fit devices, or adhesive or other bonding type mechanisms.

Figure 3:
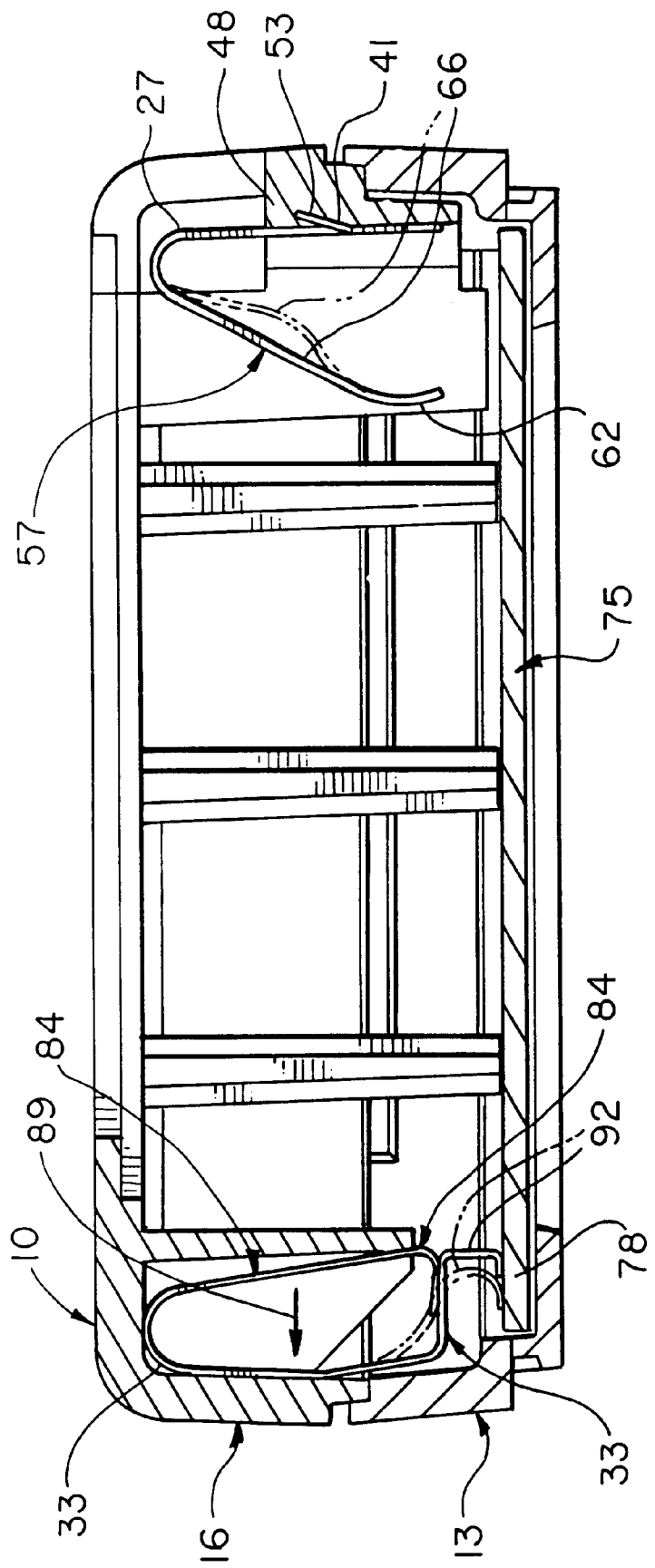
FIG. 3 is a sectional view of the device casing taken along lines A—A of FIG. 2.

As best shown in FIG. 3, the embodiment depicts a portable device casing 10 having a printed circuit board 75 or other component requiring power from a power supply means. In this embodiment, printed circuit board 75 comprises a region 78 having electrical contacts designed for electrical engagement with a power supply means either directly or indirectly. As shown in FIGS. 1, 3, 4, and 5, the construction of one embodiment of solderless battery contact 33 is such that when male extensions of power supply means protrude through receiving areas 21, 23 then such extensions contact solderless battery contact member 33. The contact occurs generally in a contact portion 84 which is itself a resilient member that is biased during contact in the direction of arrow 89. This biasing of contact portion 84 promotes further biasing of printed circuit board contact portion 92 of solderless battery contact member 33 in a direction toward printed circuit board 75. This results in electrical contact and connection between contact member 33, printed circuit board electrical connections at portion 78 and a power supply means in place within power supply chamber 19. As is appreciated, the multiple biasing, swiping, and electrical connectivity achieved by solderless battery contact member 33 cooperating with battery spring member (s) 27 accommodates slight variances in dimensions of numerous components in a manner that ultimately achieves highly reliable connectivity between a power supply means and the printed circuit board.

Figure 4:
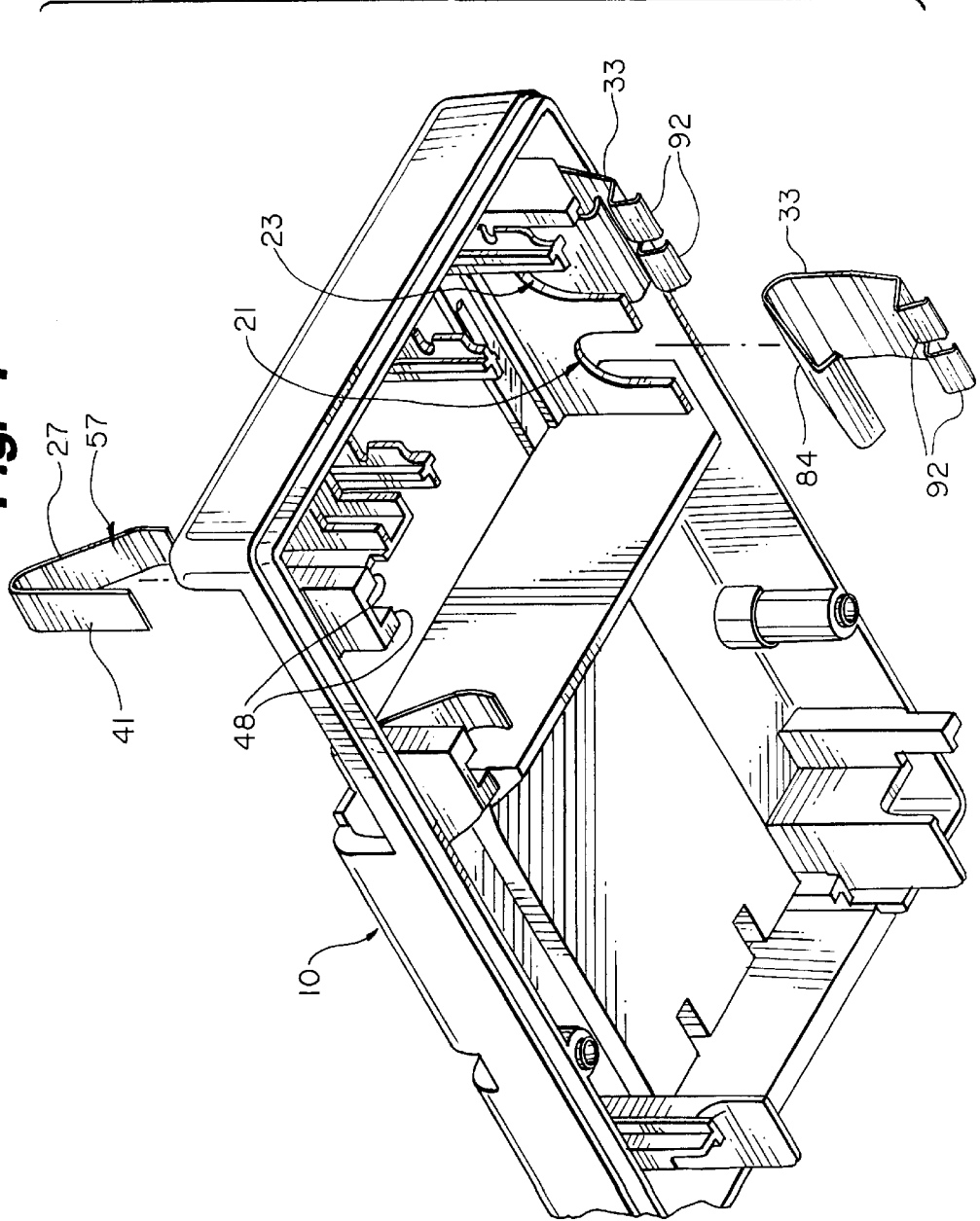
FIG. 4 is an exploded plan view of portions of the device casing of FIG. 1 shown with solderless battery contacts in varied degrees of assembly.
Figure 5:
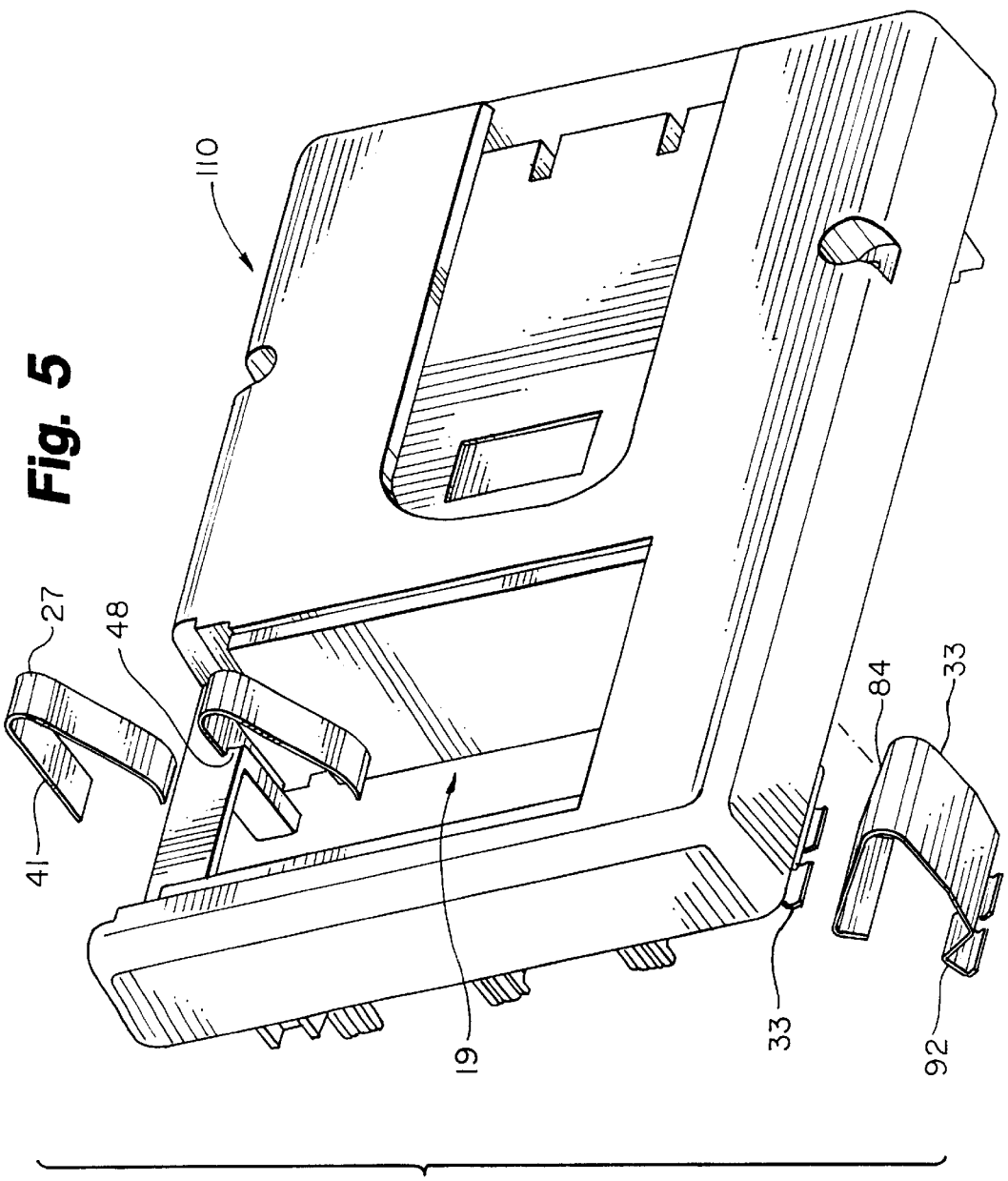
FIG. 5 is an exploded plan view of portions of the device casing of FIG. 1 and solderless battery contacts shown in various degrees of assembly.

FIGS. 4 and 5 further illustrate the features and characteristics described above, while further illustrating the ease of insertion and assembly within portions of portable device casing 10. In the embodiment shown it is recognized that a user removable protective cover is placed over power supply chamber 19 and secured with various conventional connection means prior to operation of the portable device.

The invention is further enhanced with a carrying clip. Indeed, a carrying clip is a convenient feature for many small devices, including communications devices, tools, and medical devices. For instance, a pager or a medical monitoring/treatment device such as a transcutaneous electrical nerve stimulator can be conveniently carried if it has a clip. A fully retractable clip is especially useful; for instance, the device may be more conveniently kept inside a pocket or handbag, set-up for display on a desk, or-shipped or stacked for storage by a supplier.

A fully retractable clip has important advantages compared to a clip that is partially or completely non-retractable. For example, a pager usually has its clip on the bottom of the display so that the display may be conveniently read when the pager is clipped to a belt. So if the device is placed on a table, the device must be rested on its clip for its display to be conveniently read. The clip can prevent stable and level positioning so that the device is more difficult to read or use; a problem that is particularly inconvenient when, for instance, entering data into a keypad on the device. Further, a clip that is not fully retractable interferes with stacking of the device or may become entangled with other items when stored in a pocket or handbag.

The ideal clip would be fully retractable so that the exterior of the device is flat. The retracted clip would have no protuberances or crevices that might become entangled with other objects. The clip could be easily moved from retracted to extended position. The clip would be durable, easily assembled, and made of inexpensive materials.

Figure 6:
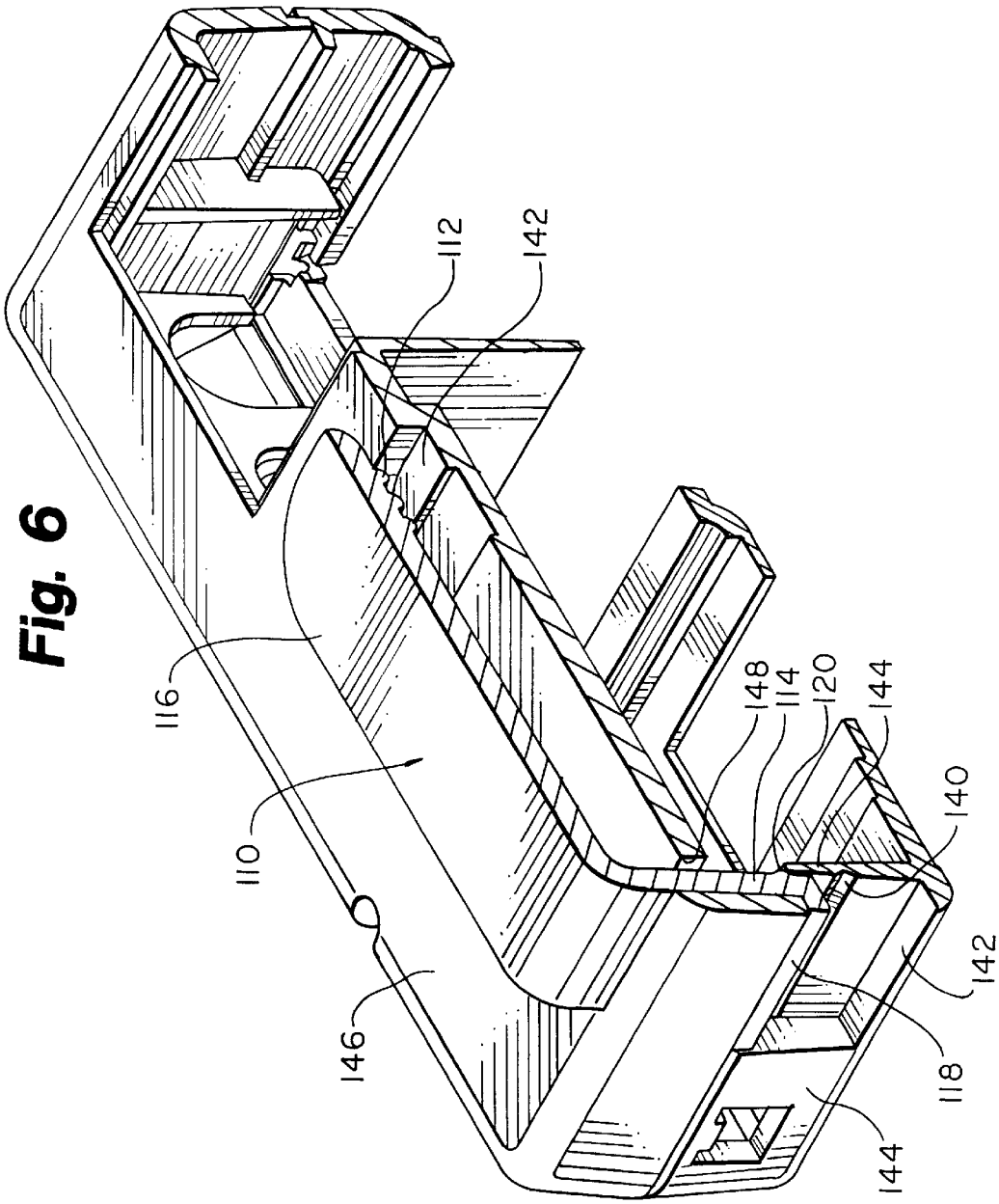
FIGS. 6 and 7 disclose further embodiments of devices of the invention.

An embodiment of a retractable clip assembly for use with another similar embodiment of a portable device casing is shown in the retracted position in FIG. 1 (device casing 10) and the extended position in FIG. 6 (device casing 100). These figures show the clip assembly as part of a case or cabinet that holds, in one type of use, a transcutaneous electrical nerve stimulator, but the clip assembly may be readily incorporated into other devices.

Referring to FIG. 6, the L-shaped clip 110 comprises front portion 114 joined at approximately right angles to back portion 116. The back portion is parallel to cabinet back 146 and fits completely within the mating recess 142 of cabinet back 146. The back portion 116 may be equipped with features such as gripping protrusions 112. The clip's front portion 114 slides within slot 148 in cabinet back 146.

The clip's front portion 114 has approximately V-shaped rib 120. The rib 120 mates with groove 140 in cabinet front 144 when the clip is in the retracted position. In the extended position, rib 120 rests on top of cabinet wall 144 so that the clip is rigidly held in place. The shape, height, and length of the rib are designed to provide a suitable locking action in both positions but also to provide for ease of manipulation between positions. There are a variety of equivalent means to provide the function of the rib, for instance, by making a row of protrusions that mate with indents, or providing a series of ridges and/or grooves.

The lip 118 extends from the clip and is accommodated by recess 142 in the cabinet front. The lip has a height and contour for ease of manipulation. It also acts as a stop for the clip when it is pushed into the extended position.

The retracting mechanism may also be equipped with a means of exerting a positive retraction force. For instance, a torsion spring may be provided between the clip and cabinet back so that a belt or similar object more be more tightly gripped. Other suitable means for exerting such forces are well-known to practitioners of these arts.

Figure 7:
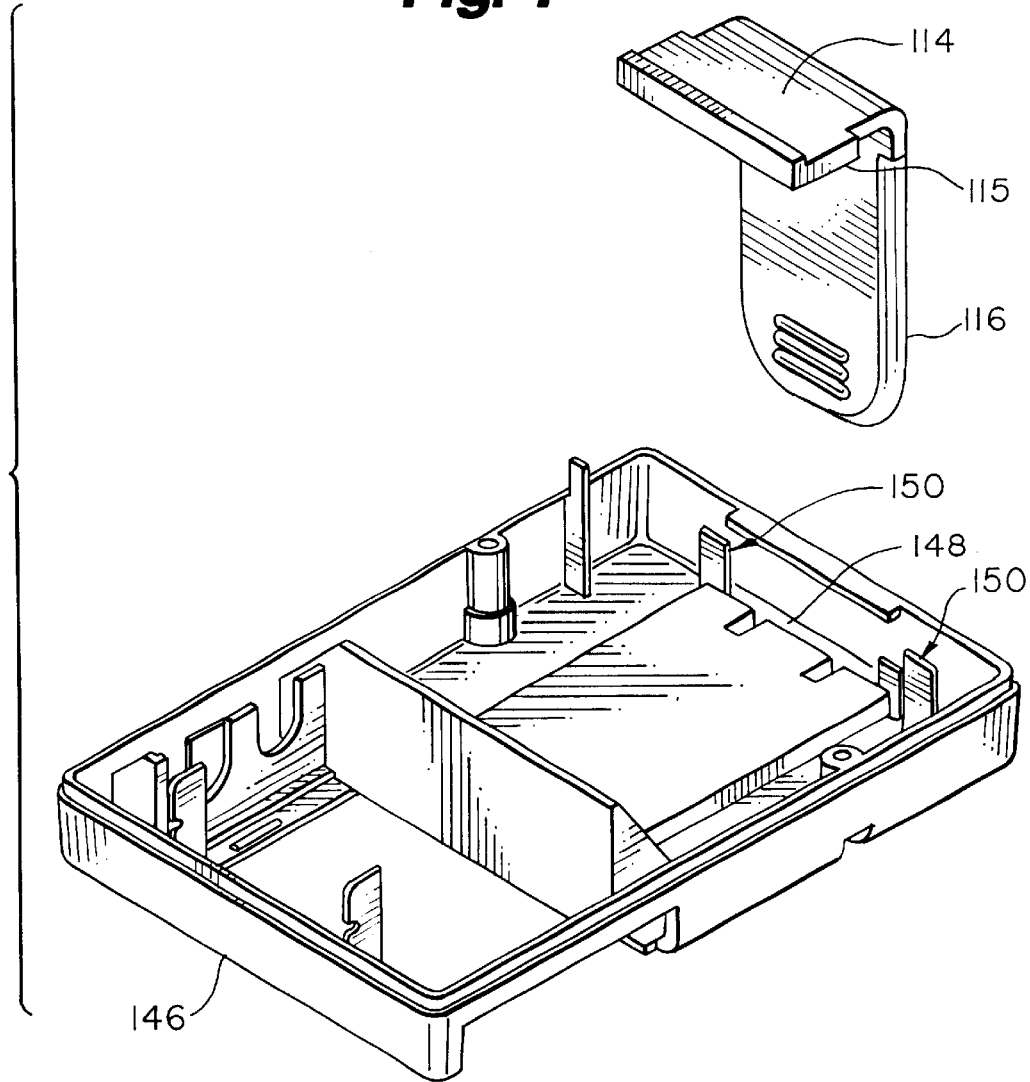

The fully retractable clip is designed for ease of manufacture and assembly. The clip may be easily made from one molded plastic part. The complete retractable clip assembly may be fully assembled by fitting the clip into the cabinet back. In one embodiment, which is depicted in FIG. 7, the clip is assembled with the cabinet back in a series of steps: the front clip portion 114 is pushed completely through slot 148; the clip is rotated 90 degrees so that the clip's front portion 114, with slide ears 115, is aligned with slide channels adjacent thereto on either side of slot 148. The front portion is pushed back through slot 148 so that slide ears 115 engage the slide channels 150 so that the clip is put into its extended position. Assembly of the remaining parts of the device is then completed and the clip may be put into the retracted position.

The simplicity of this process is achieved in part by the position and proportion of slide channels 150 around slot 148. The length of slide channels 150 and the height of slide ears 115 allow for passage of the clip front portion through slot 148 and the clip's rotation and subsequent engagement of the slide ears 115 with slide channels 150.

An alternative to the retractable clip is a design that allows for quick removal and reattachment of the clip (not shown). The slide channels, slide ears, recess in the cabinet front, and front lip may be reconfigured in a variety of ways to provide a fixed but replaceable clip.

The clip may have gussets for strength. The clip may also have gripping protrusions or other means for enhancing the clip's grip. In one embodiment, preferred materials for the cabinet and the clip are high-impact polystyrene with fiberglass fill or ABS plastic.

It is claimed:

1. A fully-retractable clip assembly for carrying a device, the clip assembly providing a clip that is fully retracted in a retracted position, the clip being usable as a clipping apparatus in an extended position, the clip assembly comprising:
   a clip comprising a front portion and a back portion;
   a means for attaching the clip to the device;
   wherein the clip is movable between the retracted position and the extended position; and
   wherein a locking mechanism to lock the clip comprises a tab and an indention for receiving the tab.

2. The clip assembly of claim 1 wherein the clip is proportioned to associate with the device so that the clip does not protrude from the device in the retracted position.

3. The clip assembly of claim 1 wherein the clip is slidably movable between the retracted position and the extended position.

4. The clip assembly of claim 1 wherein the means for attaching the clip comprises a slot in the device.

5. The clip assembly of claim, 1 wherein the locking mechanism locks the clip in the extended position.

6. The clip assembly of claim 1 wherein the tab comprises a V-shape and the indentation comprises a groove.

7. The clip assembly of claim 8 wherein the clip comprises the tab and the device comprises the groove.

8. The clip assembly of claim 1 wherein the locking mechanism further comprises a tab and a surface that abuts the tab.

9. The clip assembly of claim 8 wherein the tab is V-shaped and the surface is flat and not parallel to a portion of the clip supporting the V-shaped tab.

10. The clip assembly of claim 9 wherein the device comprises the surface and the clip comprises the V-shaped tab.

11. The clip assembly of claim 1 wherein the clip comprises a lip, said lip serving as a stop that prevents the removal of the clip from the device.

12. The assembly of claim 11 wherein the device comprises a recess that accommodates the lip, whereby the lip does not protrude from the device.

13. The clip assembly of claim 1 wherein the clip comprises gripping protrusions.

14. The clip assembly of claim 13 wherein the gripping protrusions comprise at least one ridge.

15. The clip assembly of claim 1 wherein the clip comprises gussets.

16. The clip assembly of claim 1 made of a plastic material.

17. The clip assembly of claim 16 comprising high-impact polystyrene.

18. The clip assembly of claim 17 comprising high-impact polystyrene with fiberglass fill.

19. The clip assembly of claim 16 comprising ABS plastic.

20. A fully-retractable clip assembly for carrying a device, the clip assembly providing a clip that is fully retracted in a retracted position, the clip being usable as a clipping apparatus in an extended position, the clip assembly comprising:
   a clip comprising a front portion and a back portion, wherein the clip is movable between the retracted position and the extended position;
   a means for attaching the clip to the device;
   means for facile assembly, wherein the assembly means comprises a slot in the device, the slot proportioned for receiving the clip, wherein the slot is proportioned so that only one portion of the clip may be passed through the slot; and
   wherein the device comprises slide channels and the clip comprises slide ears, wherein the slide channels are proportioned to receive the slide ears, and wherein the slide ears, the slide channels, the slot, and the clip, are proportioned and positioned so that the clip may be inserted into the slot and repositioned so that the slide ears engage the slide channels.

21. The clip assembly of claim 20 wherein the slide ears, the slide channels, the slot, and the clip, are proportioned and positioned so that the clip may be inserted into the slot and rotated approximately ninety degrees so that the slide ears engage the slide channels.

* * * * *

UNITED STATES PATENT AND TRADEMARK OFFICE
CERTIFICATE OF CORRECTION

PATENT NO. : 6,421,885 B1
DATED : July 23, 2002
INVENTOR(S) : Mowers

It is certified that error appears in the above-identified patent and that said Letters Patent is hereby corrected as shown below:

Column 2,
Line 9, delete "instead to use utilitze" and insert -- use --.
Line 34, delete "type" and insert -- types --.
Lines 61-62, delete "member (s)" and insert -- member(s) --.

Column 3,
Line 14, delete "or-shipped" and insert -- or shipped --.

Column 4,
Line 2, delete the first occurrence of "more" and insert -- can --.
Line 56, delete "claim, 1" and insert -- claim 1 --.
Line 59, delete "claim 8" and insert -- claim 6 --.

Signed and Sealed this

Fifth Day of November, 2002

*Attest:*

JAMES E. ROGAN
*Attesting Officer*    Director of the United States Patent and Trademark Office